(12) United States Patent
Arambepola et al.

(10) Patent No.: US 8,396,144 B2
(45) Date of Patent: Mar. 12, 2013

(54) METHOD AND SYSTEM FOR OFDM SYMBOL TIMING RECOVERY

(75) Inventors: Bernard Arambepola, Enfield (GB); Parveen K. Shukla, Nottingham (GB); Thushara Hewavithana, Borehamwood (GB)

(73) Assignee: Intel Corporation, Santa Clara, CA (US)

( * ) Notice: Subject to any disclaimer, the term of this patent is extended or adjusted under 35 U.S.C. 154(b) by 892 days.

(21) Appl. No.: 12/347,598

(22) Filed: Dec. 31, 2008

(65) Prior Publication Data
US 2010/0166088 A1    Jul. 1, 2010

(51) Int. Cl.
*H04J 11/00* (2006.01)
*H04L 27/28* (2006.01)

(52) U.S. Cl. ...................................... 375/260; 375/348

(58) Field of Classification Search .................. 375/142, 375/143, 144, 148, 150, 152, 316, 343, 346; 455/63.1, 114.2, 278.1, 296; 342/196; 708/404, 708/405; 379/406.13; 370/210, 395, 62, 370/507; 702/89; 713/375, 400
See application file for complete search history.

(56) References Cited

U.S. PATENT DOCUMENTS

| | | | | |
|---|---|---|---|---|
| 7,177,376 B2 * | 2/2007 | Atungsiri et al. | ............ | 375/343 |
| 8,036,291 B2 * | 10/2011 | Gu et al. | ........................ | 375/260 |
| 8,073,064 B2 * | 12/2011 | Gu et al. | ........................ | 375/260 |
| 2002/0110202 A1 * | 8/2002 | Wilson et al. | ................. | 375/340 |

FOREIGN PATENT DOCUMENTS

| | | |
|---|---|---|
| EP | 1416693 A2 | 5/2004 |
| EP | 2204958 A3 | 6/2012 |
| JP | 10070518 A | 3/1998 |
| JP | 2000022657 A | 1/2000 |
| JP | 2004153831 A | 5/2004 |

OTHER PUBLICATIONS

"Japanese Application Serial No. 2010-000270, Office Action mailed Apr. 3, 2012", With English Translation, 5 pgs.
"Chinese Application Serial No. 200911000269.5, Office Acton mailed Jun. 5, 2012", 20 pgs.
"European Application Serial No. 09180987.1, Extended Search Report mailed May 23, 2012", 8 pgs.
Chen, N., et al., "OFDM Timing Synchronisation Under Multi-path Channels", 57th IEEE SemiAnnual Vehicular Technolocgy Conference Proceedings, (Apr. 2003), 6 pgs.

* cited by examiner

*Primary Examiner* — Khanh C Tran
(74) *Attorney, Agent, or Firm* — Schwegman, Lundberg & Woessner, P.A.

(57) ABSTRACT

A method and system for OFDM symbol timing recovery is described. A symbol timing recovery module of an OFDM receiver is configured to determine an optimum trigger point for performing a discrete Fourier transform in a manner that minimizes inter-symbol interference.

23 Claims, 6 Drawing Sheets

METHOD AND SYSTEM FOR OFDM SYMBOL TIMING RECOVERY

BACKGROUND

Multicarrier modulation techniques such as orthogonal frequency-division multiplexing (OFDM), are now widely used for high speed communications over bandpass communications channels. Examples of their use include the broadcasting of digital audio and video and as the physical layer for wireless networking standards (e.g., IEEE 802.11). An OFDM system uses several low-rate sub-carriers to transmit data, where the frequencies of the sub-carriers and the symbol period are chosen so that the sub-carriers are orthogonal over the symbol period and do not interfere with one another. In an OFDM system, the data is split into N streams, which are then used to independently modulate the closely-spaced sub-carrier frequencies or tones in parallel. Practical systems use an inverse discrete Fourier transform (implemented as an inverse Fast Fourier Transform or IFFT) to generate a sampled version of a composite time-domain signal which can be converted to a signal suitable for transmission. An advantage of OFDM over single carrier modulation is the longer symbol period for a given data rate which inherently mitigates inter-symbol interference in time dispersive channels without having to resort to elaborate equalization techniques.

The basic idea of OFDM is to transmit data encoded as symbols corresponding to the constellation points of a modulation scheme such as QAM (quadrature amplitude modulation), QPSK (quadriphase shift keying), or BPSK (binary phase shift keying) on parallel modulated sub-carriers. The modulated sub-carriers are summed together to form a transmittable composite signal which can be demodulated at a receiver. The frequencies of the sub-carriers are selected so that the sub-carriers are orthogonal (i.e., uncorrelated) over the symbol period in order to allow both spectral overlap of the sub-carriers and recoverability of the symbols. Orthogonality of the sub-carriers can be achieved if the symbol period contains an integer number of cycles of each sub-carrier. An OFDM signal with minimal spacing between the sub-carriers can be produced in the following manner. Let N be the number of sub-carriers, let C[k] for k=0 to N−1 be the complex symbols which to be transmitted simultaneously, and let NT, be the OFDM symbol duration. The samples S[n] of a complex-enveloped ODFM baseband signal S(t) taken at a sampling period of $T_s$ over one symbol interval $NT_s$ can then be expressed as:

$$S[n] = \sum_{k=0}^{N-1} C[k]e^{\left(\frac{2\pi jnk}{N}\right)}$$

The above equation says that modulation of OFDM signals can be performed by an inverse discrete Fourier transform, and a discrete Fourier transform can be used to recover the C[k] symbols. The orthogonal basis functions of the discrete Fourier transform constitute the sub-carriers, and quadrature techniques can be used to generate a real-valued time-domain signal from the complex-valued exponentials. The discrete Fourier transform (DFT) and its inverse (IDFT) are preferably implemented by the fast Fourier transform algorithm (FFT).

In a typical OFDM transmitter, a serial-to-parallel converter converts a stream of input bits into N parallel streams. Groups of bits within each parallel stream are then encoded into a block of N complex-valued symbols by encoder/modulator 12, where the complex-valued symbols correspond to the constellation points of a modulation scheme such as QAM. Because these complex-valued symbols are used to determine the amplitude and phase of a particular sub-carrier, they are referred to as frequency-domain symbols. The N frequency-domain symbols, each being a complex number representing a plurality of the input bits, are next input to an N-point IDFT and converted to a serial discrete-time signal by a parallel-to-serial converter. The resulting discrete-time signal thus constitutes N samples of a time domain waveform representing a sum of orthogonal sub-carrier waveforms with each sub-carrier waveform being modulated by a frequency-domain symbol. These N samples (or the portion of an analog waveform containing the samples) may be referred to as an OFDM symbol or block. (OFDM symbols are sometimes referred to as meta-symbols, to be distinguished from the frequency domain symbols to which the input data is directly mapped.) The time domain waveform samples are then converted into an analog waveform by a digital-to-analog converter and mixed with an appropriate carrier to transmit the time-domain waveform over a communications channel. At the receiver, the time-domain waveform can then be re-sampled and discrete Fourier transformed to recover the frequency-domain symbols, which symbols are then decoded to generate the output data stream.

In actual practice, the number of frequency-domain symbols, or data subcarriers, is usually somewhat less than the total number of sub-carriers. This is done both to prevent aliasing and to provide pilot carriers which can be used for synchronization and channel equalization. Also, a guard interval is provided for each OFDM symbol in order to provide enhanced immunity to multi-path distortion. Since an OFDM symbol is the result of an IDFT, it is a periodic function and can be cyclically extended backward or forward by adding a cyclic prefix or suffix, respectively. A DFT performed on an OFDM symbol that includes samples from the guard interval but not from an adjacent OFDM symbol will simply be phased shifted from that which would be obtained by a DFT starting at the symbol boundary. Such a phase shift can be compensated for by an equalizer in the OFDM receiver. For a channel with multi-path delay spread, the received signal is a summation of the actual transmitted signal and versions of the transmitted signal with different amplitudes and delays. If the duration of the guard interval is made just larger than the maximum excess delay of the multi-path channel, no inter-symbol interference results from the multi-path delay spread.

As with any digital communications system, synchronization of an OFDM receiver with the transmitted symbols is necessary for correct demodulation. That is, the OFDM receiver must determine a trigger point for starting the DFT that results in the correct frequency-domain symbols. Such synchronization, also referred to as symbol timing recovery, may be conventionally performed using several different methods based upon, for example, embedded pilot signals or the redundancy of the guard interval. Described herein is a method and system for symbol timing recovery that is particularly suited for use in communications channels exhibiting multi-path delay spread.

DETAILED DESCRIPTION

Figure 1:
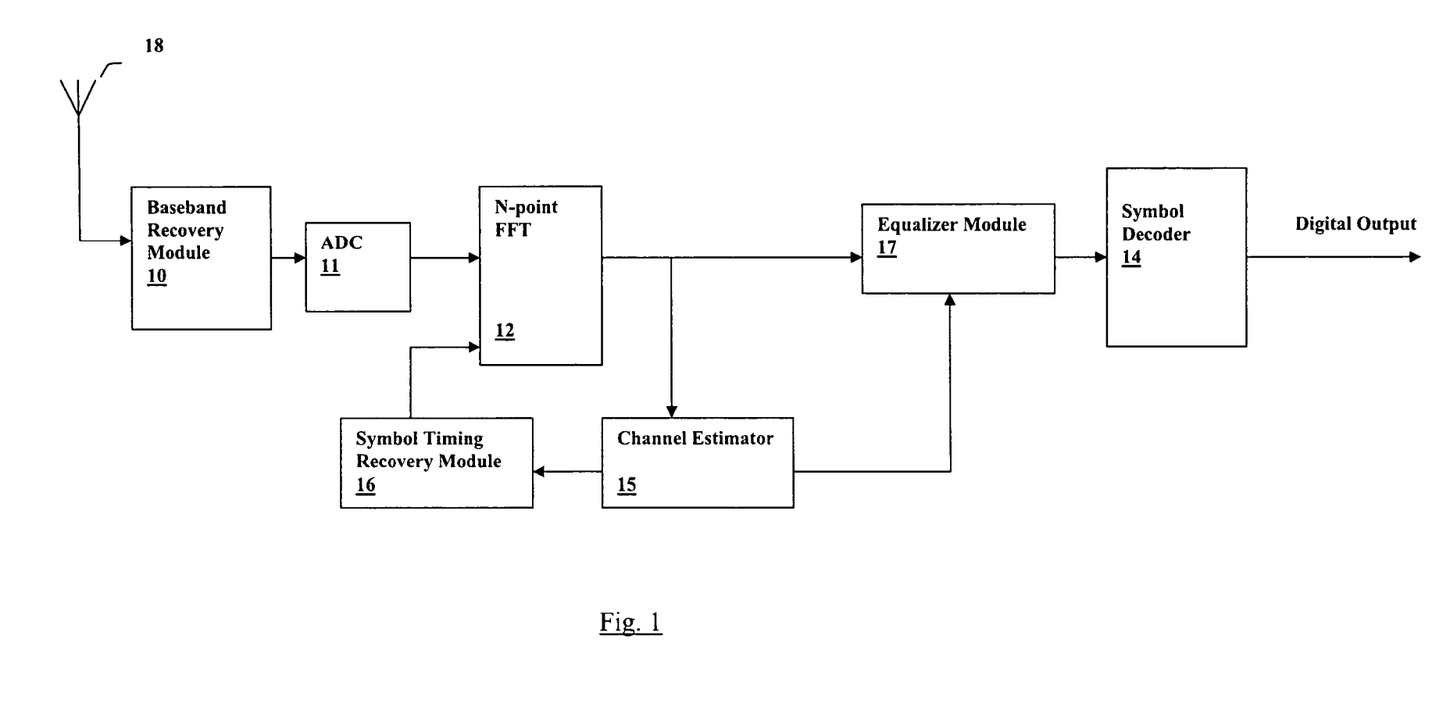
FIG. 1 illustrates the basic components of an OFDM receiver.

FIG. 1 is a block-diagram which illustrates the basic components of an exemplary OFDM receiver and demodulator. An antenna 18 or other type of coupling to a communications channel receives an input signal made up of an RF carrier signal modulated with baseband OFDM symbols. A baseband recovery module 10 recovers the baseband OFDM symbols from the modulated carrier. The baseband recovery module recovers real and imaginary parts of the OFDM symbols by quadrature mixing with sine and cosine signals at the carrier frequency. An analog-to-digital converter 11 then converts the OFDM symbols into complex-valued digital samples that are fed to an OFDM demodulator 12. The OFDM symbols are assumed to consist of an OFDM symbol proper that is N samples in length to which is appended an M sample-length guard interval that is either a cyclic prefix or cyclic suffix The OFDM demodulator performs serial-to-parallel conversion on the serial OFDM symbol samples and then performs an N-point DFT on N samples of every N+M samples to effectively remove the guard interval. The sample location within the N+M samples at which the N-point DFT starts is referred to as herein as the trigger point. A symbol timing recovery module 16 determines the trigger point for the performance of the DFT by the OFDM demodulator 12. The OFDM demodulator produces N complex-valued frequency-domain symbols that correspond to the constellation points of a modulation scheme such as QAM. In order to compensate for distortion of the signal caused by the frequency response of the communications channel, a channel estimator 15 estimates the frequency response of the channel from known OFDM symbols that are intermittently embedded into the input signal such as in the form of a preamble or pilot signal. From the estimated channel frequency response, an equalizer module 17 performs a complex multiplication of each frequency domain symbol to compensate for the amplitude and/or phase distortion caused by the channel. The compensated frequency-domain symbols are then decoded by symbol decoder 14 according to the particular modulation scheme employed, and the resulting data is converted to serial form to produce the digital output data.

Described below are algorithms executed by the symbol timing recovery) module 16 that may be used in any OFDM system that employs a cyclic guard interval and is particularly suited for use where there is multi-path distortion. The symbol timing recovery module 16 may be a dedicated hardware component or may be implemented as instructions executed by a digital processor. Such instructions may be contained in a suitable storage medium from which they are transferred to a memory or other processor-executable medium.

The algorithms described herein are applicable to digital video and audio broadcast applications such as DVB-T, DVB-H, ISDB-T, T-DMB, DAB, and DVB-2 standards as well as networking protocols such as IEEE 802.11x. Most algorithms for cyclic prefix or cyclic suffix OFDM assume the echoes produced by multi-path delay spread to be within the guard interval. Network planners do try to design Single Frequency Networks (SFNs) to satisfy this assumption, but it is impossible to guarantee it in a terrestrial environment. Hence digital terrestrial television receivers are required to take into account echoes outside the guard interval. The algorithms described below do not make any assumption about the location of the multi-path and hence are applicable to situations in which the echo or multi-path is inside or outside the guard interval. The algorithms are designed to locate the optimum symbol start or DFT trigger position by minimizing inter-symbol interference with reference to any echo profile. It can also be used in mobile receivers and can rapidly track time-varying echo profiles.

The discussions below are with reference to an OFDM system that appends a cyclic prefix to the OFDM symbols. It should be readily appreciated, however, that the discussions could equally apply, mutatis mutandis, to systems employing any type of cyclic guard interval such as a cyclic suffix.

Guard Intervals and ISI

Figure 2:
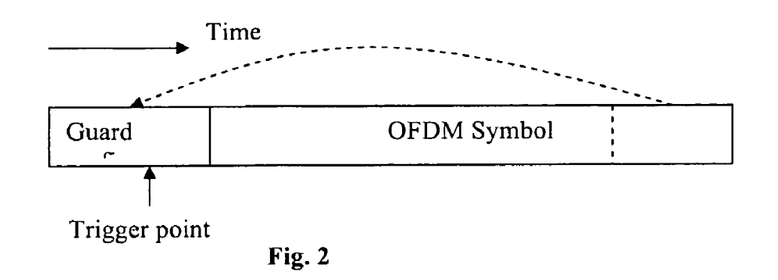
FIGS. 2 through 9 illustrate various aspects of OFDM symbols and inter-symbol interference.

Each OFDM symbol with a cyclic-prefix type of guard interval takes the form shown in FIG. 2. The guard interval separates successive OFDM symbols. For DVB-T/H and ISDB-T the guard interval is a ratio of the OFDM symbol, where the ratio can take values 1/32, 1/16, 1/8 or 1/4. For T-DMB and DAB the guard interval is fixed at 1/4. The tail of the OFDM symbol is repeated as the guard prefix. If the DFT is triggered within the guard interval there will be no inter-symbol interference (ISI).

As long as all the multi-path is within the guard interval, then it is possible to trigger the DFT required for OFDM demodulation so that there is no ISI. Although it is highly desirable to have all the reflections or echoes of the transmitted signal within the guard interval, no terrestrial SFN planner can guarantee this. A roof-top antenna can easily receive a signal from a fairly distant transmitter. A mobile DVB-H receiver can receive a signal from a transmitter outside the guard band depending on its location in a dense built-up environment. Although intersymbol interference can be reduced by making the guard interval larger in these situations, there are costs in doing so. The guard interval is actually wasted time (or wasted bits) because no new signal is transmitted during this period. For example, the use of a guard ratio of 25% corresponds to a 20% loss of data. It would be desirable, therefore, for the receiver to work well even when the echoes are outside the guard interval. Since inter-symbol-interference cannot be avoided when the multi-path is outside the guard interval, the algorithms described below provide the optimum DFT trigger point that minimizes this ISI. Furthermore, they rapidly adapt to changing echo scenarios to continually provide the optimum point for DFT triggering and are hence suitable for mobile applications as well.

Symbol Timing Recovery

As noted previously, symbol timing recovery is equivalent to obtaining the optimum position to trigger the DFT. At the start, an initial point is required to trigger the DFT, which may be referred to as an acquisition phase of symbol timing recovery. An initial trigger point may be obtained using an auto-correlation. Since the guard interval is a cyclic repetition, if the OFDM signal is correlated with a replica of itself, delayed with respect to the original by $T_u$ (symbol period), then the correlation peak is obtained at the center of the guard interval. Other well known algorithms could also be employed. This method does not give the optimum trigger position in the presence of multi-path, but is good enough to get the receiver moving.

The algorithms for symbol timing recovery described herein are used in what may be called the tracking phase after an initial trigger point is determined. For this, the channel impulse response (CIR) that is obtained by taking the inverse Fourier transform (IDFT) of the channel frequency response (CFR) is used. The CFR is conventionally computed in OFDM receivers for use in OFDM channel equalization. The algorithms described below re-use the CFR (by taking its IDFT) to optimize symbol timing recovery.

The computation of the channel frequency response may be performed using conventional and well-known techniques. OFDM transmissions usually have embedded pilots to estimate the CFR and assist with channel equalization. In the case of DAB and T-DMB, for example, there is a periodic preamble transmission that allows the receiver to work out the channel frequency response on a periodic basis. In the case of DVB-T/H and ISDB-T, there are scattered pilots. Let $T_u$ be the symbol period. Then the carrier separation is $1/T_u$. The scattered pilots of each symbol are spaced at $12/T_u$. In other words, every $12^{th}$ carrier is a pilot. However, the scattered pilots are staggered from symbol to symbol. For example, in the first symbol the SP locations are: 0, 12, 24, . . . . In the second symbol the SP locations are: 3, 15, 27, . . . . In the third symbols SP locations are: 6, 18, 30, . . . . In the fourth symbol: 9, 21, 33, . . . . In the fifth symbol: 0, 12, 24, 36, . . . . Hence the SP pattern repeats every four symbols. So using this SP sequence, it is possible to obtain the channel frequency response at carrier locations: 0, 3, 6, 9, 12, 15, 18, . . . . In other words the CFR can be worked out with a frequency spacing of 3/Tu. (This can then be interpolated to get the channel frequency response with carrier spacing (1/TL), which can then used for equalization.) In DVB-T2 there are scattered pilots as well as periodic preambles. Therefore, these can be used to get a CFR with carrier spacing 1/Tu. In T-DMB and DAB, the CFR can be estimated at every carrier location, i.e. with 1/Tu spacing. This can be done in DVB-T2 as well using the preamble. In DVB-T, the CFR can be estimated with 3/Tu spacing using scattered pilots.

Figure 3:
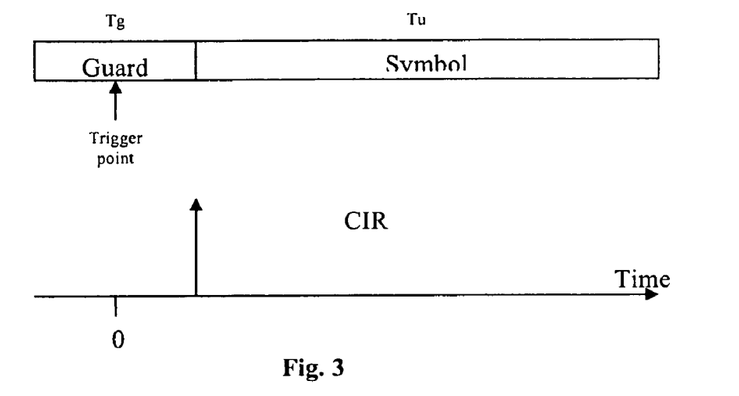
Figure 4:
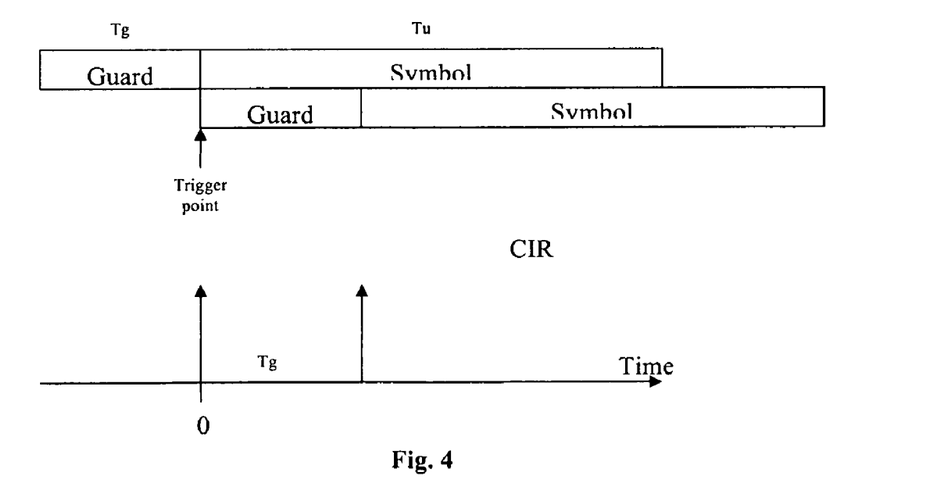

For the purpose of the discussion to follow (to illustrate the algorithms), let us assume that the channel frequency response has been estimated at every carrier location, i.e. with spacing 1/Tu. We now estimate the CIR by taking the inverse DFT (IDFT) of the CFR. To illustrate the structure of the CIR, let us consider a few examples. First, consider the case of no multi-path. Then, as explained earlier, the trigger point worked out by the autocorrelation during acquisition will be at the center of the guard interval. Therefore, the channel impulse response will have a peak at Tg/2 to the left of the time origin as illustrated in FIG. 3. Now consider the case of a 0 dB echo at guard interval as illustrated by FIG. 4. The trigger point obtained by autocorrelation will be at the center of the "composite" guard interval, and the impulse response will consist of two peaks, one at the time origin and the other Tg to the right of this, where Tg is the guard interval. Note that the time origin will always be the trigger position.

It is true that in both the above instances, the autocorrelation has resulted in DFT trigger points within the guard interval of the main symbol and thereby have not resulted in any ISI. However, this is not always the case for all echo scenarios. Even in FIG. 4, we have assumed that the autocorrelation is perfect and that the correlation peak has been detected precisely. In practice, in the presence of noise the actual correlation peak (hence initial trigger point) will be $\pm\Delta T$ from the ideal point and this will lead to ISI. If there are echoes outside the guard interval, then the autocorrelation will definitely not find the optimum trigger point.

Figure 5:
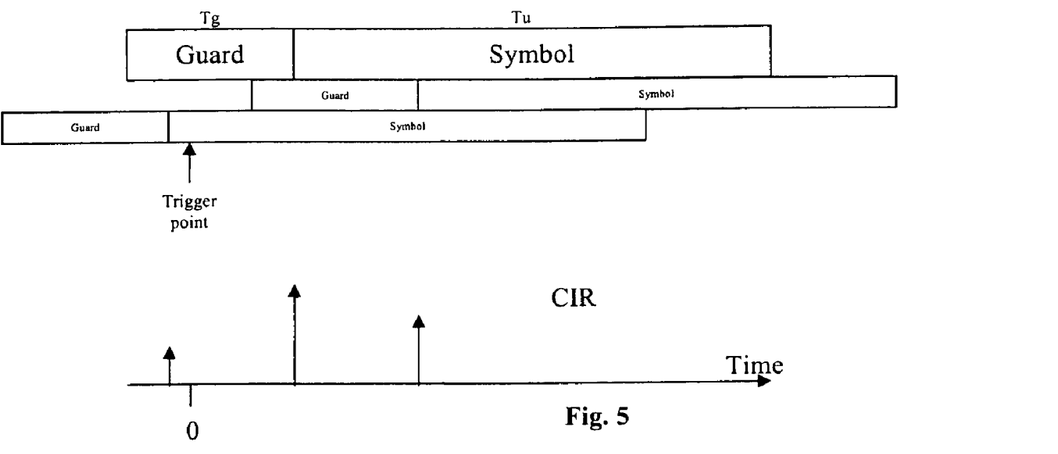

The example in FIG. 5 illustrates echoes outside the guard interval. There is one –6 dB pre-echo at –0.75 Tg with respect to the main path, i.e. before the main path. There is a –3 dB post-echo at 0.75 Tg with respect to the main path (which is taken as 0 dB). In a general situation there will be a lot of multi-path and a fairly complex impulse response as a result of the IDFT of the CFR.

Algorithm for Optimizing Symbol Timing Recovery to Minimize ISI

Figure 6:
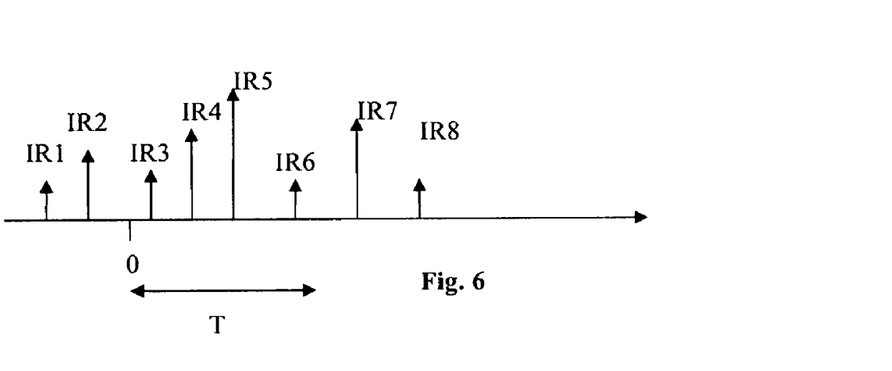

Let us re-visit the three examples of the preceding section. In every channel impulse response, the time origin represents the DFT trigger position. Based on this, we can make the following assertion. All the impulse response components that are within a window of length Tg right of the time origin do not contribute to any ISI, where Tg is the guard interval. This is illustrated by FIG. 6. In FIG. 6, the multi-path components corresponding to IR3, IR4, IR5 and IR6 do not contribute to any ISI. However, the components corresponding to IR1, IR2, IR7 and IR8 do cause ISI. Note that for illustration purposes we have shown the CIR to be very clean, but in reality we will not get distinct impulsive peaks, as there will be some spread around the peaks. The arguments given here still apply, however.

Figure 7:
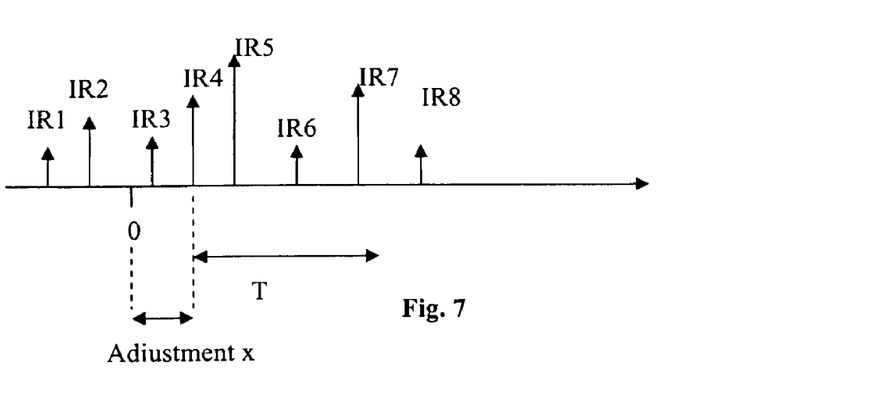

Note that we have not treated the main echo path any different from any other path. In FIG. 7, IR5 may well be the main path corresponding to the strongest received echo, but it is treated the same as any other multi-path. It is the combination of all these paths that is the complete received OFDM signal. In the first assertion, it was stated that no ISI is generated by the CIR components in the region 0 to Tg. We can actually go a step further and work out the ISI due to CIR components outside this interval. Let IR1 to IR8 refer to a measure of the magnitude of the CIR at a particular sample location (e.g., the power or square of the amplitude). Let the time co-ordinates of the 8 points be $\tau_1$ to $\tau_8$. The first two values of these are of course negative. The ISI caused by the four echoes IR1, IR2, IR7 and IR8 is then given by the following equation.

$$ISI = IR1^*(-\tau_1) + IR2^*(-\tau_2) + IR7^*(\tau_7 - T_g) + IR8^*(\tau_8 - T_g) \quad (1)$$

To obtain the optimum trigger point we have to adjust the position of the time origin until this ISI is minimized. Continuing with the above example, let us move the trigger point to capture IR7 as shown in FIG. 7. Then IR3 goes out of the window and begins to contribute to ISI. The new ISI value is given by:

$$ISI_1 = IR1^*(-\tau_1 + x) + IR2^*(-\tau_2 + x) + IR3^*(x - \tau_3) + IR8^*(\tau_8 - T_g - x) \quad (2)$$

where the adjustment is given by x. If $ISI_1 < ISI$ then we can reduce the inter-symbol-interference by making a trigger point adjustment of x with respect to the current trigger position.

Figure 11:
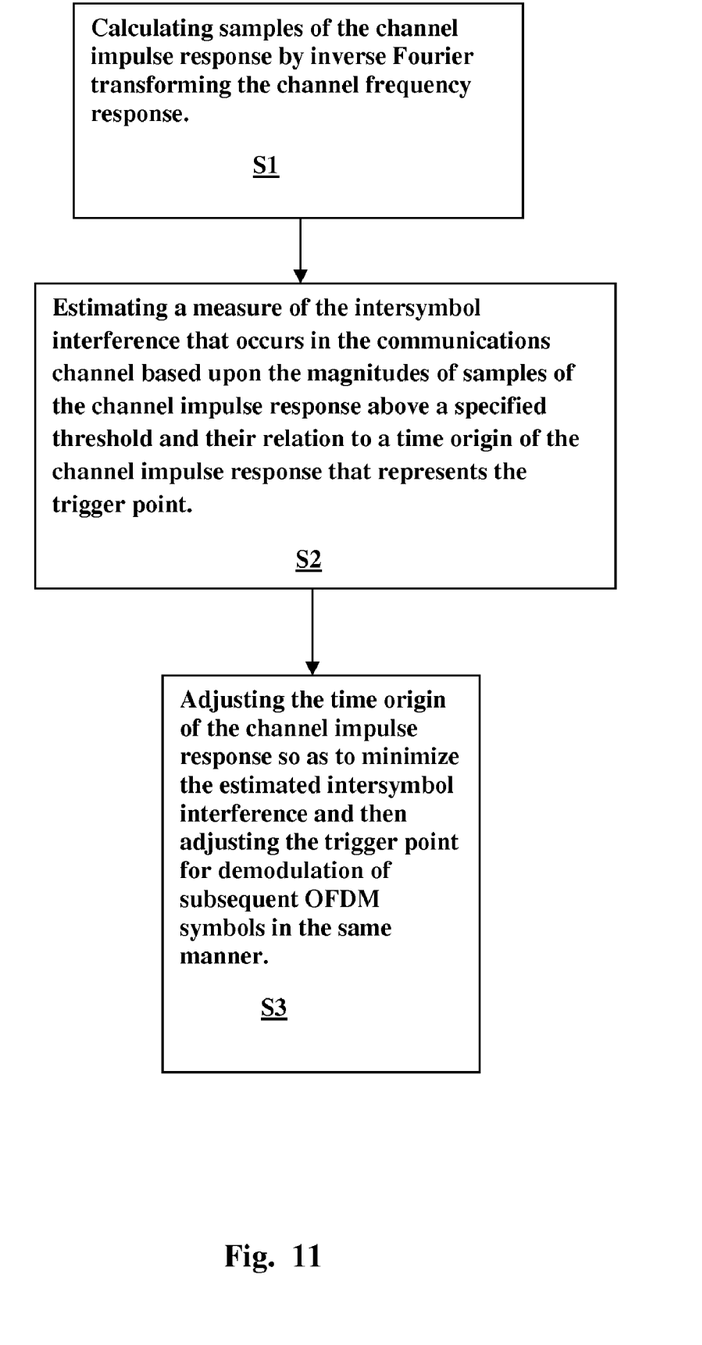
FIG. 11 illustrates an example symbol timing recovery procedure.

In one particular basic embodiment, an orthogonal frequency division multiplexing (OFDM) receiver includes: 1) a coupling to a communications channel for receiving serially transmitted OFDM symbols, wherein an OFDM symbol is made up of an integer N number of time-domain samples from which N frequency-domain symbols may be extracted by discrete Fourier transformation of the N time-domain samples and wherein a guard interval of length $T_g$ is interposed between consecutively transmitted OFDM symbols, each such guard interval being made up of a specified number of time domain samples that correspond to a cyclic extension of an adjacent OFDM symbol, 2) a demodulator for demodulating the serially received time domain samples by discrete Fourier transforming N consecutive samples starting at a specified trigger point to recover N frequency-domain symbols from each received OFDM symbol, 3) a channel estimator for extracting frequency-domain symbols from OFDM symbols making up a pilot or preamble signal and calculating a channel frequency response therefrom, and 4) a symbol timing recovery module for adjusting the trigger point for performing the discrete Fourier transform. The symbol timing recovery module is configured to calculate samples of a channel impulse response by inverse Fourier transforming the channel frequency response, estimate a measure of the intersymbol interference that occurs in the communications channel based upon the magnitudes of samples of the channel impulse response above a specified threshold and their relation to the time origin of the channel impulse response, and adjust the time origin of the channel impulse response so as to minimize the estimated intersymbol interference and then adjusting the trigger point for demodulation of subsequent OFDM symbols in the same manner. The procedure performed by the symbol timing recovery module is illustrated in FIG. 11 as steps S1 through S3. The symbol timing recovery module may be configured to estimate the measure of the intersymbol interference that occurs in the channel by a weighted sum of the magnitudes of the samples of the channel impulse response above the specified threshold with each sample magnitude weighted according to its relation to the time origin of the channel impulse response. The symbol timing recovery module may be further configured to adjust the trigger point by computing a trigger adjustment (Trigger_Adjustment) that is added to a current trigger position (Current_Trigger_Position) as:

Trigger_Adjustment=min_ISI_loc−Current_Trigger_Position and such that the location of time origin of the channel impulse response that produces minimal intersymbol interference (min_ISI_loc) is found by estimating the intersymbol interference that results for time origin locations corresponding to a specified subset of the sample locations of the channel impulse response and selecting the location that produces the least intersymbol interference.

In the case where the guard interval is a cyclic prefix, samples of the channel impulse response that occur after the time origin and within an interval from the time origin equal to the length of the guard interval $T_g$ are not considered in estimating the intersymbol interference occurring in the channel, the magnitudes of samples of the channel impulse response occurring before the time origin are weighted proportionate to their distance from the time origin, and the magnitudes of samples of the channel impulse response occurring after the time origin are weighted proportionate to an amount by which their distance from the time origin exceeds the length of the guard interval $T_g$. In the case where the guard interval is a cyclic suffix, samples of the channel impulse response that occur before the time origin and within an interval from the time origin equal to the length of the guard interval $T_g$ are not considered in estimating the intersymbol interference Occurring in the channel, the magnitudes of samples of the channel impulse response occurring after the origin are weighted proportionate to their distance from the time origin, and the magnitudes of samples of the channel impulse response occurring before the origin are weighted proportionate to an amount by which their distance from the time origin exceeds the length of the guard interval $T_g$.

Exemplary Algorithm

Let $$I(i), \text{for } i=0,1,\ldots,N-1 \qquad (3)$$

be the channel impulse response obtained by taking the IDFT of the channel frequency response. These N points cover a period equal to the symbol duration Tu. This is a cyclic sequence that has to be unwrapped into a linear form along the time axis. In one embodiment, this is done by assuming that all the multi-path lie between −Tu/2 and +Tu/2 of the maximum peak of the channel impulse response, where the magnitude of the CIR is greatest. Let the location of the maximum peak be:

$i_{peak}$

Figure 8:
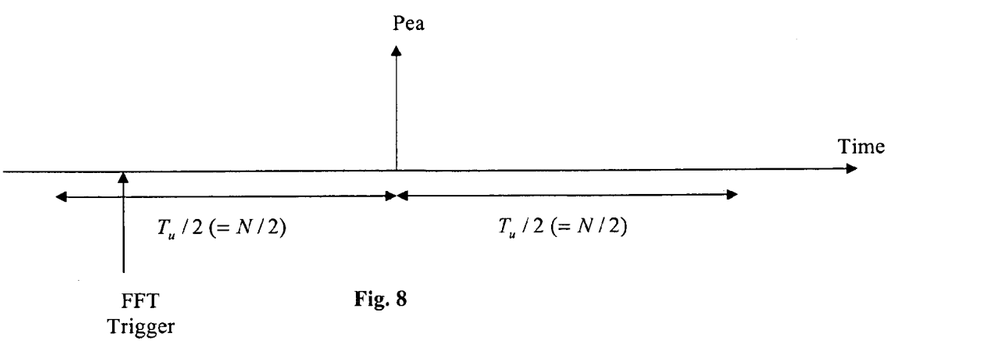
Figure 9:
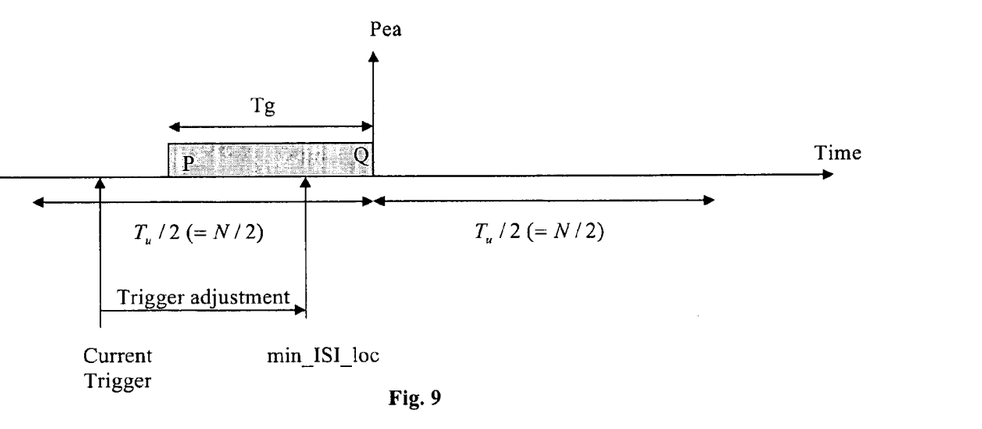

Then we assume that all the multi-path lie between −Tu/2 to +Tu/2 from the above location. That is, a maximum peak of the channel impulse response where the sample magnitude is greatest is identified, and the channel impulse response is then unfolded with respect to the time origin such that a specified portion (e.g., one-half) of the channel impulse response is located after the maximum peak to represent post-echoes with respect to the maximum peak and such that the remaining portion of the channel impulse response is located prior to the maximum peak to represent pre-echoes. Let us name the un-wrapped channel impulse response:

$$IR(i), \text{for } i=0,1,\ldots,N-1 \qquad (4)$$

as illustrated in FIG. 8. The current trigger point is given by the time origin of the sequence before this cyclic unwrapping, i.e. the origin of sequence of equation (3). In the first version of the algorithm, we force the trigger point to be within the guard interval of the peak of the impulse response. Then the trigger point can be anywhere within the shaded area shown in FIG. 9. Now we want to find the point within this shaded area that minimizes ISI. We want to work out the ISI value corresponding to every point in the shaded region using the equations given in the preceding section. The point in the shaded region at which the ISI is a minimum is given in figure above by min_ISI_loc. Then the trigger adjustment is given by:

Trigger_Adjustment=min_ISI_loc−Current_Trigger_Position

Working out the ISI for every point in the shaded region can be very expensive in computations. Hence using the algebra below we work out a set of simple recurrence relations to work out this ISI.

Let Tg be equal to M in terms of samples. For example, if the guard ratio is ¼, then M=N/4. Hence $Q=N/2$ $$P=(N/2)-M \qquad (5)$$

Let us start from the point P. The ISI at point P is given by the following equation:

$$ISI(P) = \text{pre\_echo\_isi}(P) + \text{post\_echo\_isi}(P) \qquad (6)$$

where $$\text{pre\_echo\_isi}(P) = \sum_{i=0}^{P-1} IR(i)(P-i) \qquad (7)$$

$$\text{pre\_echo\_isi}(P) = \sum_{i=Q+1}^{N-1} IR(i)(i-Q) = \sum_{i=P+T_g+1}^{N-1} IR(i)(i-(P+T_g)) \qquad (8)$$

In addition, define two other variables as the total sum of pre and post_echo as follows:

$$\text{pre\_echo}(P) = \sum_{i=0}^{P} IR(i) \qquad (9)$$

$$\text{post\_echo}(P) = \sum_{i=Q+1}^{N-1} IR(i) = \sum_{i=P+T_g+1}^{N-1} IR(i) \qquad (10)$$

Now when we move the point to (P+1), equation (6) still holds, but equations (8) and (9) become:

$$\text{pre\_echo\_isi}(P+1) = \sum_{i=0}^{P} IR(i)(P+1-i) = \sum_{i=0}^{P-1} IR(i)(P-i) + \sum_{i=0}^{P} IR(i) \quad (11)$$

$$\text{post\_echo\_isi}(P+1) = \sum_{i=Q+2}^{N-1} IR(i)(i-Q-1) = \sum_{i=Q+1}^{N-1} IR(i)(i-Q) - \sum_{i=Q+1}^{N-1} IR(i) \quad (12)$$

$$\text{post\_echo\_isi}(P+1) = \sum_{i=P+T_g+1}^{N-1} IR(i)(i-Q) - \sum_{i=P+T_g+1}^{N-1} IR(i)$$

Now we can write the following equations:

$$\text{pre\_echo\_isi}(P+1) = \text{pre\_echo\_isi}(P) + \text{pre\_echo}(P) \quad (13)$$

$$\text{post\_echo\_isi}(P+1) = \text{post\_echo\_isi}(P) - \text{post\_echo}(P) \quad (14)$$

From these we can derive a general set of recurrence relations:

$$\text{pre\_echo\_isi}(m) = \text{pre\_echo\_isi}(m-1) + \text{pre\_echo}(m-1) \quad (15)$$

$$\text{post\_echo\_isi}(m) = \text{post\_echo\_isi}(m-1) - \text{post\_echo}(m-1) \quad (16)$$

$$\text{pre\_echo}(m) = \text{pre\_echo}(m-1) + IR(m) \quad (17)$$

$$\text{post\_echo}(m) = \text{post\_echo}(m-1) - IR(m+M) \quad (18)$$

$$ISI(m) = \text{pre\_echo\_isi}(m) + \text{post\_echo\_isi}(m) \quad (19)$$

for $$m = P+1, P+2, \ldots, Q$$

Figure 10:
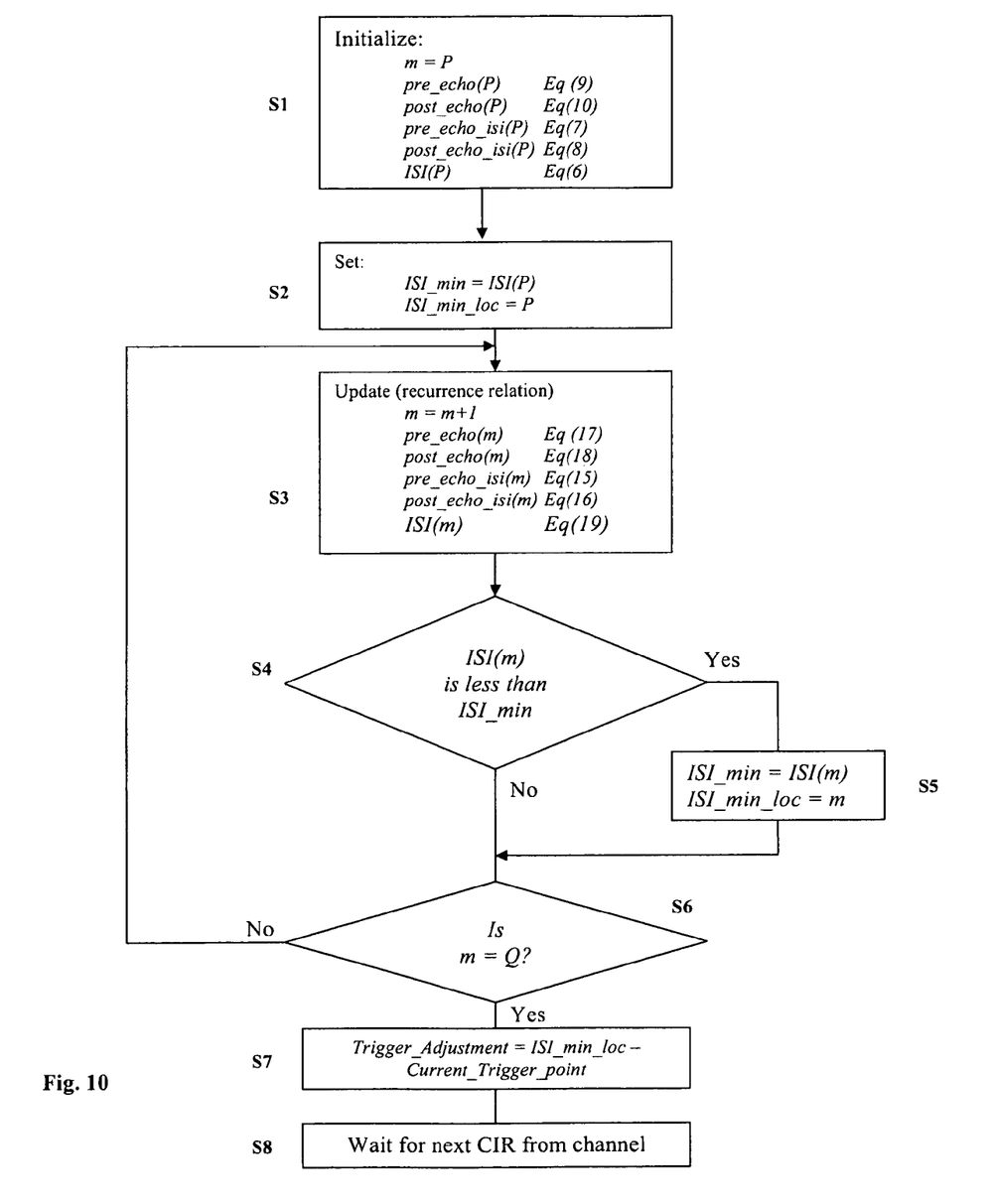
FIG. 10 is a flow diagram of an exemplary algorithm for OFDM symbol timing recovery.

From these we can work out the location of the point of minimum ISI. The above-described algorithm is illustrated by the flow diagram in FIG. 10 as steps S1 through S8.

In an alternative embodiment of the algorithm, rather than the search being confined within an interval $T_g$ preceding the maximum peak (i.e., over only the shaded area of FIG. 9), the search is performed over the entire time interval of the channel impulse response. For example, the point P may be set to $-Tu/2$ with reference to the maximum peak and point Q set to $+Tu/2$ with respect to the maximum peak. Otherwise the algorithm is exactly as described before.

The preceding sections described algorithms that derive the DFT trigger point adjustment required to minimize inter symbol interference in OFDM based on the channel impulse response (CIR) calculated by taking inverse DFT of the channel frequency response. The channel frequency response is obtained in the frequency domain with the aid of pilots and/or preambles. The CIR is conventionally used for OFDM channel equalization. The described algorithms re-use the CIR for symbol timing recovery to minimize ISI. The channel impulse response is continually updated, and the symbol timing (i.e., DFT trigger point) is correspondingly continually updated. In practice, one may apply only a fraction of the adjustment estimated in order to prevent large trigger point fluctuations and to allow the trigger point to converge relatively slowly to the optimum point. In mobile applications this convergence rate may have to be increased because the multi-path profile is changing fairly rapidly.

It may be the case that the channel impulse response over a time interval Tu is known. This is the case for T-DMB and DAB (Digital Audio Broadcasting) and is also the case for DVB-T2 (based on preamble). However, for DVB-T, the channel impulse response is available only over a period of Tu/3. The same algorithm is applicable. The above discussions have considered only inter-symbol-interference minimization due to possible echoes outside the guard interval. However, echoes outside the guard interval also give rise to inter-carrier interference (ICI). The algorithms presented here also reduce the effect of ICI as well.

The invention has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

What is claimed is:

1. A method, comprising:
   receiving OFDM (Orthogonal Frequency Division Multiplexing) symbols over a communications channel, wherein a guard interval of length Tg is interposed between the OFDM symbols;
   demodulating the OFDM symbols by discrete Fourier transforming N consecutive samples, where N is an integer, starting at a specified trigger point;
   calculating a channel frequency response;
   adjusting the trigger point for performing the discrete Fourier transform by: 1) calculating samples of a channel impulse response by inverse Fourier transforming the channel frequency response, 2) estimating a measure of the intersymbol interference that occurs in the communications channel based upon the magnitudes of samples of the channel impulse response above a specified threshold and their relation to a time origin of the channel impulse response that represents the trigger point, and 3) adjusting the time origin of the channel impulse response so as to minimize the estimated intersymbol interference and then adjusting the trigger point for demodulation of subsequent OFDM symbols in the same manner.

2. The method of claim 1 wherein the measure of the intersymbol interference that occurs in the channel is estimated by a weighted sum of the magnitudes of the samples of the channel impulse response above the specified threshold with each sample magnitude weighted according to its relation to the time origin of the channel impulse response.

3. The method of claim 2 further comprising:
   identifying a maximum peak of the channel impulse response where the sample magnitude is greatest; and
   unfolding the channel impulse response such that a specified portion of the channel impulse response is located after the maximum peak to represent post-echoes with respect to the maximum peak and such that the remaining portion of the channel impulse response is located prior to the maximum peak to represent pre-echoes.

4. The method of claim 2 wherein:
   the guard interval is a cyclic prefix;
   samples of the channel impulse response that occur after the time origin and within an interval from the time origin equal to the length of the guard interval $T_g$ are not considered in estimating the intersymbol interference occurring in the channel;

the magnitudes of samples of the channel impulse response occurring before the time origin are weighted proportionate to their distance from the time origin; and, the magnitudes of samples of the channel impulse response occurring after the time origin are weighted proportionate to an amount by which their distance from the time origin exceeds the length of the guard interval $T_g$.

5. The method of claim 2 wherein:

the guard interval is a cyclic suffix;

samples of the channel impulse response that occur before the time origin and within an interval from the time origin equal to the length of the guard interval $T_g$ are not considered in estimating the intersymbol interference occurring in the channel;

the magnitudes of samples of the channel impulse response occurring after the time origin are weighted proportionate to their distance from the time origin; and, the magnitudes of samples of the channel impulse response occurring before the time origin are weighted proportionate to an amount by which their distance from the time origin exceeds the length of the guard interval $T_g$.

6. The method of claim 2 wherein the trigger point is adjusted by computing a trigger adjustment (Trigger_Adjustment) that is added to a current trigger position (Current_Trigger_Position) as:

Trigger_Adjustment=min_*ISI*_loc−Current_Trigger_Position and wherein the location of time origin of the channel impulse response that produces minimal intersymbol interference (min_ISI_loc) is found by estimating the intersymbol interference that results for time origin locations corresponding to a specified subset of the sample locations of the channel impulse response and selecting the location that produces the least intersymbol interference.

7. The method of claim 6 wherein the location of time origin of the channel impulse response that results in minimal intersymbol interference (min_ISI_loc) is found by:

(a) initializing a location variable m for the location of the time origin as $m=P$ where P corresponds to a particular time origin location in terms of sample locations of the channel impulse response that is prior to a sample location Q of a maximum peak in the channel impulse response;

(b) initializing the following variables for the time origin location P where IR(i) is a measure of the magnitude of the channel impulse response at a sample location i relative to the time origin:

$$\text{pre\_echo\_isi}(P) = \sum_{i=0}^{P-1} IR(i)(P-i)$$

$$\text{post\_echo\_isi}(P) = \sum_{i=Q+1}^{N-1} IR(i)(i-Q) = \sum_{i=P+T_g+1}^{N-1} IR(i)(i-(P+T_g))$$

$$\text{pre\_echo}(P) = \sum_{i=0}^{P} IR(i)$$

$$\text{post\_echo}(P) = \sum_{i=Q+1}^{N-1} IR(i) = \sum_{i=P+T_g+1}^{N-1} IR(i)$$

$$ISI(P) = \text{pre\_echo\_isi}(P) + \text{post\_echo\_isi}(P)$$

where pre_echo is the sum of the magnitudes of the channel impulse response prior to location P, post_echo is the sum of the magnitudes of the channel impulse response subsequent to location Q, pre_echo_isi is the sum of the magnitudes of the channel impulse response prior to location P weighted by their sample distance from location P, post_echo_isi is the sum of the magnitudes of the channel impulse response subsequent to location Q weighted by their sample distance from location Q, ISI is an estimate of the intersymbol interference that results from a trigger point corresponding to a particular time origin of the channel impulse response, ISI_min represents the minimum value of ISI, and ISI_min_loc represents the location of the time origin that minimizes ISI;

(c) setting:

ISI_min=ISI(P)

ISI_min_loc=P (d) changing the value of m to a new time origin location by setting:

$m=m+1$ where m+1 corresponds to the new time origin location in terms of samples;

(e) updating the following variables as:

pre_echo_isi(m)=pre_echo_isi(m−1)+pre_echo(m−1)

post_echo_isi(m)=post_echo_isi(m−1)−post_echo(m−1)

pre_echo(m)=pre_echo(m−1)+IR(m)

post_echo(m)=post_echo(m−1)−IR(m+M)

ISI(m)=pre_echo_isi(m)+post_echo_isi(m)

where m−1 corresponds to the value of m before being changed at step (d) and M is the number of samples in the guard interval;

(f) if is less than ISI_min then setting:

ISI_min=ISI(m)

ISI_min_loc=m (g) iteratively performing steps (d) through (f).

8. The method of claim 7 wherein the variable m is incremented during steps (d) through (f) from an initial time origin location P that is located M number of samples before the location of a maximum peak in the channel impulse response.

9. The method of claim 8 wherein the variable m is incremented M number of times during steps (d) through (f) until the variable m reaches the location of the maximum peak in the channel impulse response.

10. The method of claim 7 wherein the variable m is incremented during steps (d) through (f) such that m goes through every sample location of the channel impulse response.

11. An orthogonal frequency division multiplexing (OFDM) receiver, comprising:

a coupling to a communications channel for receiving serially transmitted OFDM symbols, wherein an OFDM symbol is made up of an integer N number of time-domain samples from which N frequency-domain symbols may be extracted by discrete Fourier transformation of the N time-domain samples and wherein a guard interval of length $T_g$ is interposed between consecutively transmitted OFDM symbols, each such guard interval being made up of a specified number of time domain samples that correspond to a cyclic extension of an adjacent OFDM symbol;

a demodulator for demodulating the serially received time domain samples by discrete Fourier transforming N consecutive samples starting at a specified trigger point to recover N frequency-domain symbols from each received OFDM symbol;

a channel estimator for extracting frequency-domain symbols from OFDM symbols making up a pilot or preamble signal and calculating a channel frequency response therefrom;

a symbol timing recovery module for adjusting the trigger point for performing the discrete Fourier transform, wherein the symbol timing recovery module is configured to:

calculate samples of a channel impulse response by inverse Fourier transforming the channel frequency response;

estimate a measure of the intersymbol interference that occurs in the communications channel based upon the magnitudes of samples of the channel impulse response above a specified threshold and their relation to a time origin of the channel impulse response that represents the trigger point, and adjust the time origin of the channel impulse response so as to minimize the estimated intersymbol interference and then adjusting the trigger point for demodulation of subsequent OFDM symbols in the same manner.

12. The receiver of claim 11 wherein the symbol timing recovery module is configured to estimate the measure of the intersymbol interference that occurs in the channel by a weighted sum of the magnitudes of the samples of the channel impulse response above the specified threshold with each sample magnitude weighted according to its relation to the time origin of the channel impulse response.

13. The receiver of claim 12 wherein the symbol timing recovery module is configured to:

identify a maximum peak of the channel impulse response where the sample magnitude is greatest; and unfold the channel impulse response such that a specified portion of the channel impulse response is located after the maximum peak to represent post-echoes with respect to the maximum peak and such that the remaining portion of the channel impulse response is located prior to the maximum peak to represent pre-echoes.

14. The receiver of claim 12 wherein the symbol timing recovery module is configured such that:

the guard interval is a cyclic prefix;

samples of the channel impulse response that occur after the time origin and within an interval from the time origin equal to the length of the guard interval $T_g$ are not considered in estimating the intersymbol interference occurring in the channel;

the magnitudes of samples of the channel impulse response occurring before the time origin are weighted proportionate to their distance from the time origin; and the magnitudes of samples of the channel impulse response occurring after the time origin are weighted proportionate to an amount by which their distance from the time origin exceeds the length of the guard interval $T_g$.

15. The receiver of claim 12 wherein the symbol timing recovery module is configured such that:

the guard interval is a cyclic suffix;

samples of the channel impulse response that occur before the time origin and within an interval from the time origin equal to the length of the guard interval $T_g$ are not considered in estimating the intersymbol interference occurring in the channel;

the magnitudes of samples of the channel impulse response occurring after the time origin are weighted proportionate to their distance from the time origin; and the magnitudes of samples of the channel impulse response occurring before the time origin are weighted proportionate to an amount by which their distance from the time origin exceeds the length of the guard interval $T_g$.

16. The receiver of claim 12 wherein the symbol timing recovery module is configured to adjust the trigger point by computing a trigger adjustment (Trigger_Adjustment) that is added to a current trigger position (Current_Trigger_Position) as:

Trigger_Adjustment=min_ISI_loc− Current_Trigger_Position and such that the location of time origin of the channel impulse response that produces minimal intersymbol interference (min_ISI_loc) is found by estimating the intersymbol interference that results for time origin locations corresponding to a specified subset of the sample locations of the channel impulse response and selecting the location that produces the least intersymbol interference.

17. The receiver of claim 16 wherein the symbol timing recovery module is configured such that the location of time origin of the channel impulse response that results in minimal intersymbol interference (min_ISI_loc) is found by:

(a) initializing a location variable m for the location of the time origin as $m=P$ where P corresponds to a particular time origin location in terms of sample locations of the channel impulse response that is prior to a sample location Q of a maximum peak in the channel impulse response;

(b) initializing the following variables for the time origin location P where IR(i) is a measure of the magnitude of the channel impulse response at a sample location i relative to the time origin:

$$\text{pre\_echo\_isi}(P) = \sum_{i=0}^{P-1} IR(i)(P-i)$$

$$\text{post\_echo\_isi}(P) = \sum_{i=Q+1}^{N-1} IR(i)(i-Q) = \sum_{i=P+T_g+1}^{N-1} IR(i)(i-(P+T_g))$$

$$\text{pre\_echo}(P) = \sum_{i=0}^{P} IR(i)$$

$$\text{post\_echo}(P) = \sum_{i=Q+1}^{N-1} IR(i) = \sum_{i=P+T_g+1}^{N-1} IR(i)$$

$$ISI(P) = \text{pre\_echo\_isi}(P) + \text{post\_echo\_isi}(P)$$

where pre_echo is the sum of the magnitudes of the channel impulse response prior to location P, post_echo is the sum of the magnitudes of the channel impulse response subsequent to location Q, pre_echo_isi is the sum of the magnitudes of the channel impulse response prior to location P weighted by their sample distance from location P, post_echo_isi is the sum of the magnitudes of the channel impulse response subsequent to location Q weighted by their sample distance from location Q, ISI is an estimate of the intersymbol interference that results from a trigger point corresponding to a particular time origin of the channel impulse response, ISI_min represents the minimum value of ISI, and ISI_min_loc represents the location of the time origin that minimizes ISI;

(c) setting:

$$ISI\_min=ISI(P)$$

$$ISI\_min\_loc=P$$

(d) changing the value of m to a new time origin location by setting:

$$m=m+1$$

where m+1 corresponds to the new time origin location in terms of samples;

(e) updating the following variables as:

$$pre\_echo\_isi(m)=pre\_echo\_isi(m-1)+pre\_echo(m-1)$$

$$post\_echo\_isi(m)=post\_echo\_isi(m-1)-post\_echo(m-1)$$

$$pre\_echo(m)=pre\_echo(m-1)+IR(m)$$

$$post\_echo(m)=post\_echo(m-1)-IR(m+M)$$

$$ISI(m)=pre\_echo\_isi(m)+post\_echo\_isi(m)$$

where m−1 corresponds to the value of m before being changed at step (d) and M is the number of samples in the guard interval;

(f) if is less than ISI_min then setting:

$$ISI\_min=ISI(m)$$

$$ISI\_min\_loc=m$$

(g) iteratively performing steps (d) through (f).

18. The receiver of claim 17 wherein the symbol timing recovery module is configured such that the variable m is incremented during steps (d) through (f) from an initial time origin location P that is located M number of samples before the location of a maximum peak in the channel impulse response.

19. The receiver of claim 18 wherein the symbol timing recovery module is configured such that the variable m is incremented M number of times during steps (d) through (f) until the variable m reaches the location of the maximum peak in the channel impulse response.

20. The receiver of claim 17 wherein the symbol timing recovery module is configured such that the variable m is incremented during steps (d) through (f) such that m goes through every sample location of the channel impulse response.

21. A non-transitory medium containing processor-executable instructions for performing a method for demodulating an orthogonal frequency division multiplexing (OFDM) signal that comprises:

receiving serially transmitted OFDM symbols over a channel, wherein an OFDM symbol is made up of an integer N number of time-domain samples from which N frequency-domain symbols may be extracted by discrete Fourier transformation of the N time-domain samples and wherein a guard interval of length $T_g$ is interposed between consecutively transmitted OFDM symbols, each such guard interval being made up of a specified number of time domain samples that correspond to a cyclic extension of an adjacent OFDM symbol;

demodulating the serially received time domain samples by discrete Fourier transforming N consecutive samples starting at a specified trigger point to recover N frequency-domain symbols from each received OFDM symbol;

extracting frequency-domain symbols from OFDM symbols making up a pilot or preamble signal and calculating a channel frequency response therefrom;

adjusting the trigger point for performing the discrete Fourier transform by:

calculating samples of a channel impulse response by inverse Fourier transforming the channel frequency response;

estimating a measure of the intersymbol interference that occurs in the communications channel based upon the magnitudes of samples of the channel impulse response above a specified threshold and their relation to the time origin of the channel impulse response, and adjusting the time origin of the channel impulse response so as to minimize the estimated intersymbol interference and then adjusting the trigger point for demodulation of subsequent OFDM symbols in the same manner.

22. The medium of claim 21 wherein the measure of the intersymbol interference that occurs in the channel is estimated by a weighted sum of the magnitudes of the samples of the channel impulse response above the specified threshold with each sample magnitude weighted according to its relation to the time origin of the channel impulse response.

23. The medium of claim 22 wherein the trigger point is adjusted by computing a trigger adjustment (Trigger_Adjustment) that is added to a current trigger position (Current_Trigger_Position) as:

$$Trigger\_Adjustment=min\_ISI\_loc-Current\_Trigger\_Position$$

and wherein the location of time origin of the channel impulse response that produces minimal intersymbol interference (min_ISI_loc) is found by estimating the intersymbol interference that results for time origin locations corresponding to a specified subset of the sample locations of the channel impulse response and selecting the location that produces the least intersymbol interference.

* * * * *